United States Patent
Alzahmi et al.

(10) Patent No.: US 12,043,725 B1
(45) Date of Patent: Jul. 23, 2024

(54) PROCESS TO RECYCLE AND PRODUCE PET/CARBON FIBER COMPOSITES

(71) Applicant: UNITED ARAB EMIRATES UNIVERSITY, Al Ain (AE)

(72) Inventors: Salem Alzahmi, Al Ain (AE); Waleed Ahmed, Al Ain (AE); Fatima Salem Sarhan Saeed Alkaabi, Al Ain (AE); Ghdayra Omar Ahmed Mohammed Almahri, Al Ain (AE); Kaouthar Madi, Al Ain (AE); Khaled Ali Shehadeh, Al Ain (AE); Yahia Ali Badran, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 18/140,331

(22) Filed: Apr. 27, 2023

(51) Int. Cl.
 *C08K 7/06* (2006.01)
 *C08K 3/04* (2006.01)

(52) U.S. Cl.
 CPC . *C08K 7/06* (2013.01); *C08K 3/04* (2013.01)

(58) Field of Classification Search
 CPC ........... C08K 7/06; B29B 17/00; B29B 17/04; B29B 17/0404; B29B 17/0412; B29B 7/42; B29B 13/10; B29B 2017/042; B29B 2017/0484; B29B 2017/0472; B29K 2067/003; B29K 2867/003; B29K 2105/06; B29K 2105/12; B29K 2105/26; B29C 48/00; B29C 48/03; B29C 48/05
 See application file for complete search history.

(56) References Cited

U.S. PATENT DOCUMENTS

| 10,071,505 | B2 * | 9/2018 | Dauner | B29C 48/0022 |
| 10,343,328 | B1 | 7/2019 | Sherga | |
| 11,578,433 | B2 * | 2/2023 | Mercader | B29C 70/345 |
| 2019/0275707 | A1 | 9/2019 | Ahmed | |
| 2020/0198186 | A1 * | 6/2020 | Sahajwalla | B29B 17/0412 |
| 2021/0332198 | A1 | 10/2021 | Liao et al. | |
| 2022/0306890 | A1 * | 9/2022 | Gorin | D01F 6/46 |
| 2022/0324140 | A1 * | 10/2022 | Dubois | B29B 17/0206 |
| 2023/0226788 | A1 * | 7/2023 | Tobin | C08G 63/183 |
| | | | | 428/163 |
| 2024/0042653 | A1 * | 2/2024 | Dubois | B29B 17/0206 |

FOREIGN PATENT DOCUMENTS

| EP | 2562206 A1 * | 2/2013 | C08J 11/06 |
| EP | 3012078 A1 * | 4/2016 | B29B 17/00 |
| JP | 2021133685 A | 9/2021 | |

OTHER PUBLICATIONS

EPO Machine translation of EP 2562206 A1 to Koehler et al., published Feb. 27, 2013 (Year: 2013).*

* cited by examiner

*Primary Examiner* — Jane L Stanley
(74) *Attorney, Agent, or Firm* — Nath, Goldberg & Meyer; Joshua B. Goldberg

(57) ABSTRACT

The disclosure of the present patent application relates generally to a process to recycle both polyethylene terephthalate (PET) and carbon fiber reinforced composite (CFRP) prepreg (fibers pre-impregnated with typically thermoset resin) and/or CFRP materials to produce a PET/Carbon Fiber Composite where the optimum amount of carbon fibers positively affects the mechanical and physical properties, and such properties were improved over pure recycled PET. The process of breaking down both the PET and CFRP product(s) into pieces for recycling is mechanical-only, and the broken-down pieces are combined in a single screw extruder with varying percentages of recycled CFRP pieces to determine the amount of CFRP pieces that produces the optimum mechanical and physical properties that are particularly improved over pure recycled PET.

12 Claims, 5 Drawing Sheets

PROCESS TO RECYCLE AND PRODUCE PET/CARBON FIBER COMPOSITES

BACKGROUND

1. Field

The disclosure of the present patent application relates generally to a process to recycle both polyethylene terephthalate (PET) and carbon fiber reinforced polymers (CFRP) to produce a PET/Carbon Fiber Composite having improved mechanical and physical properties as compared to pure recycled PET.

2. Description of the Related Art

In recent years, usage of plastics has increased significantly, and as a result, a large amount of plastic waste is produced. Since generally plastics are not easily degradable, recycling of the plastics and how to process the plastics after recycling have become particularly important issues.

Massive quantities of waste materials like carbon fiber reinforced plastics or polymers (CFRP) waste comes from aerospace industries and polyethylene terephthalate (PET) waste mainly comes from the consumption of water bottles.

The most widely used plastic recycling method is traditional recycling (mechanical recycling), which is suitable for thermoplastics such as PET, which are polymers that can be melted and solidified almost over and over with no change in their chemical composition. The second recycling method is advanced recycling (chemical recycling), where chemicals are used to break down the plastics to form raw materials that can be used to produce plastic. In both cases, many steps are required, and the chemical method involves using solvents combined with heating.

Polyethylene terephthalate (PET) makes up a major portion of recycled plastics, as recycled PET plastics make up about 52.4% of the total amount of recycled plastics. To deal with such a large amount of recycled PET plastics, researchers in relevant fields have dedicated themselves to developing a method for processing the recycled PET plastics. Out of the current techniques, the most common method for PET recycling is to recycle PET in a physical (mechanical) manner. The recycled PET plastics that have been washed clean are firstly shredded to pieces and melted under high temperature, and then are extruded by an extruder to produce recycled PET chips (also called r-PET). In the current industry, PET recycling is mainly carried out by physical recycling. However, functional components (such as a slipping agent, an electrostatic pinning agent, etc.) are not allowed to be added during a manufacturing process for making recycled chips that are produced through such a physical recycling process. Therefore, it is necessary to use additional new/not recycled PET chips for adding the above-mentioned functional components.

Fiber reinforced polymer (FRP) composite materials consist of a polymeric matrix and reinforcement fibers, making CFRP a subgroup of FRP. The matrix is usually a thermoset polymer, due to its better mechanical properties and better fiber-matrix adhesion. A major disadvantage of FRPs is the difficulty of recycling them. Landfilling and incineration have been the predominant methods of dealing with FRPs for a long time. However, these are not sustainable approaches since they are unable to solve the issues related to waste accumulation (landfilling) or require intensive energy consumption (incineration).

FRP recycling is not carried out for economic reasons, as the recycled fibers obtained are short (therefore losing the added value of long fibers) and more expensive than virgin fibers. Thus, the motivation for recycling is not to reduce raw material costs but to cope with the high volume of FRP waste that is expected in the upcoming years, when wind energy elements and aircrafts reach their end-of-life. Current methods for recycling CFRP are mainly separated into chemical and mechanical methods, each of which have shortcomings such as inconsistent properties that are not as effective as virgin carbon fibers, costliness, and powder recycling having little potential to be reused in the original thermoset compounds.

Reinforcing fabrics which have been pre-impregnated with resin are commonly referred to as "prepregs". Prepregs are used in numerous different industries, with over ten million tons of prepregs being manufactured each year. Approximately 20% of all prepreg production goes to the aerospace industry, particularly in the form of carbon fiber prepregs such as carbon fiber reinforced polymers (CFRP). Since prepregs are fabrics, which must be cut or shaped for their particular applications, large amounts of prepreg waste, including expired CFRP prepregs, are produced in the form of offcuts, scrap, and defective material. Uncured carbon fiber prepreg scrap is primarily generated during ply cutting operations or is in the form of expired prepreg or prepreg beyond its recommended lifetime or freezer life. In the former case, the scrap waste is typically in the form of very small, randomly sized and shaped pieces, making it highly impractical to remove the backing films for proper recycling. In the latter case, expired materials are often seen as undesirable for recycling purposes, so such waste is either directly disposed of in landfills or donated in whole condition to research universities for research and development purposes. Following research and development, the scrap is often disposed of, once again, by directly depositing it in landfills.

Despite the fact there have been processes to recycle or attempts to recycle or dispose of the above materials, there has thus far not been a successful process for recycling each, reducing waste, and combining them into a useful product with mechanical and physical properties improved over regular recycled PET.

Thus, it would be desirable to develop a process to recycle both PET and CFRP prepreg and/or CFRP to produce a PET/Carbon Fiber Composite where the amount of carbon fibers positively affected the mechanical and physical properties of the composite, and where such properties were improved over pure recycled PET while solving the aforementioned problems.

SUMMARY

The present subject matter relates to a method to recycle and produce polyethylene terephthalate (PET)/Carbon Fiber Composites, as well as PET/Carbon Fiber Composite products produced by such methods. More specifically, the present subject matter relates to an economical and practical recycling method to recycle waste carbon-fiber reinforced polymers (CFRP), including expired carbon fiber (CF) prepreg, and waste polyethylene terephthalate (PET), such as from water bottles, by mechanical processes to produce a composite having improved mechanical properties, including over pure recycled PET.

The present composite has a wide range of applications and is considered a sustainable solution to the massive quantities of waste materials like CFRP waste that comes from aerospace industries and PET waste that comes from the consumption of water bottles.

In one embodiment, the present subject matter is related to a method to recycle and produce PET/Carbon Fiber Composites that is an economical and practical to handle waste Carbon-fiber reinforced polymers (CFRP), including expired carbon fiber (CF) prepreg, and waste Polyethylene terephthalate (PET) such as from water bottles by mechanical processes to produce optimum mechanical properties of the composite that are improved over those produced by other previous and current processes.

In this regard, in an embodiment, the present subject matter is directed to a method to produce polyethylene terephthalate (PET)/Carbon Fiber (CF) composite filaments, the method comprising: obtaining waste carbon fiber reinforced polymer (CFRP) material; shredding the CFRP material into CFRP small pieces; grinding the CFRP small pieces using a ball mill grinder to obtain ground CFRP; obtaining waste polyethylene terephthalate (PET); shredding the waste PET into PET small pieces; drying the PET small pieces; mixing the PET small pieces and the ground CFRP using a single screw extruder to produce PET/CF composite filaments, wherein the PET/CF composite filaments comprise about 10% to about 40% of CF.

In another embodiment, the present subject matter is directed to PET/CF composite filaments produced according to the methods provided herein. The thus produced composite filaments can have mechanical and physical properties improved over those of pure recycled PET.

These and other features of the present subject matter will become readily apparent upon further review of the following specification.

DETAILED DESCRIPTION OF THE PREFERRED EMBODIMENTS

Figure 1:
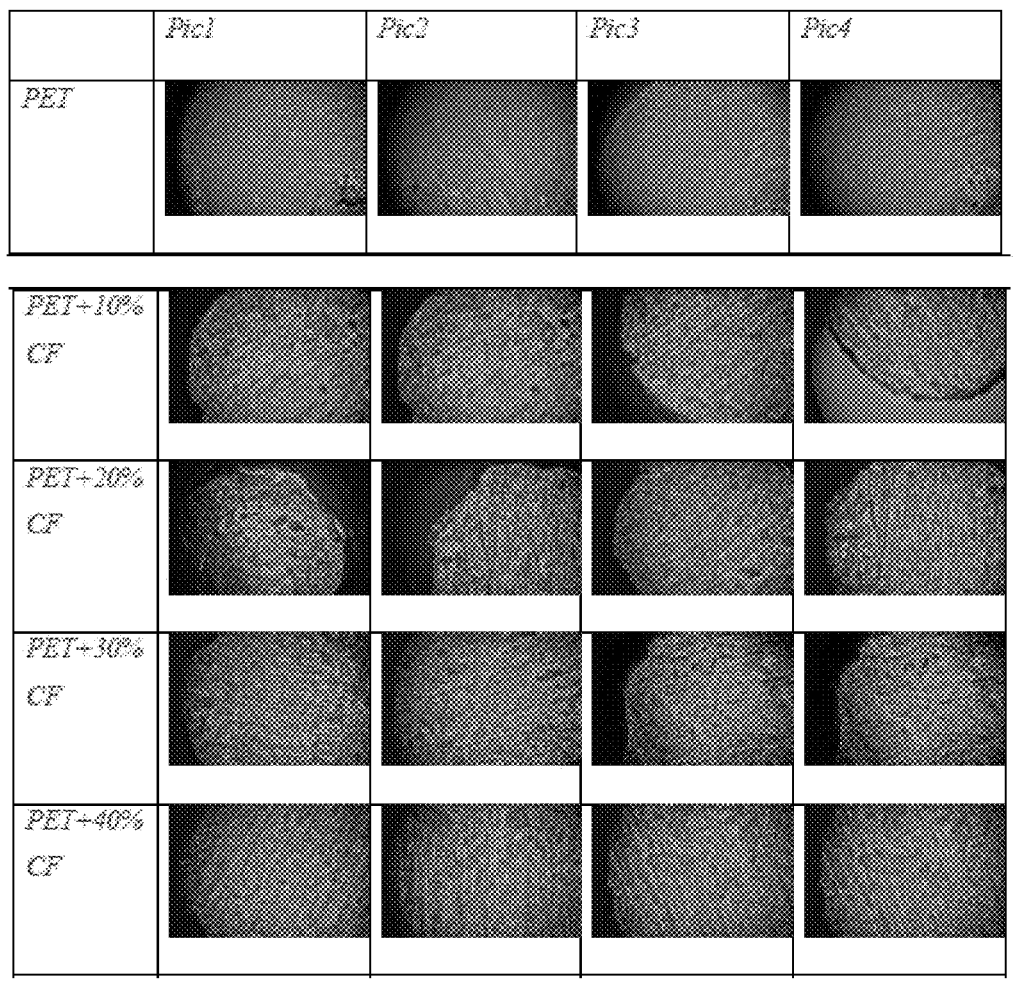
FIG. 1 shows Microscope Photos of extruded filaments produced according to the present methods.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

As used herein, "prepreg" materials, or "prepregs", refer to reinforcing fabrics which have been pre-impregnated with resin.

As used herein, "virgin" means a polymer or other material supplied commercially in the form of granules (unused or firsthand) before being plasticized. "Waste" polymers include situations where a virgin polymer is used in preparation of plastic products and some amount of the material is discarded until flowability is achieved; that discarded virgin polymer is considered waste polymer in the context of this application.

As used herein, "CFRP/PET" and "PET/Carbon Fiber (CF)" can be used interchangeably to refer to the presently produced composites, and "CFRP" and "CF" can be used interchangeably.

The present subject matter relates to a method to recycle and produce polyethylene terephthalate (PET)/Carbon Fiber Composites, as well as PET/Carbon Fiber Composite products produced by such methods. More specifically, the present subject matter relates to an economical and practical recycling method to recycle waste carbon-fiber reinforced polymers (CFRP), including expired carbon fiber (CF) prepreg, and waste polyethylene terephthalate (PET), such as from water bottles, by mechanical processes to produce a composite having improved mechanical properties, including over pure recycled PET. The present composite has a wide range of applications and is considered a sustainable solution to the massive quantities of waste materials like CFRP waste that comes from aerospace industries and PET waste that comes from the consumption of water bottles.

In one embodiment, the present subject matter is related to a method to recycle and produce PET/Carbon Fiber Composites that is an economical and practical to handle waste Carbon-fiber reinforced polymers (CFRP), including expired carbon fiber (CF) prepreg, and waste Polyethylene terephthalate (PET) such as from water bottles by mechanical processes to produce optimum mechanical properties of the composite that are improved over those produced by other previous and current processes.

In this regard, in an embodiment, the present subject matter is directed to a method to produce polyethylene terephthalate (PET)/Carbon Fiber (CF) composite filaments, the method comprising: obtaining waste carbon fiber reinforced polymer (CFRP) material; shredding the CFRP material into CFRP small pieces; grinding the CFRP small pieces using a ball mill grinder to obtain ground CFRP; obtaining waste polyethylene terephthalate (PET); shredding the waste PET into PET small pieces; drying the PET small pieces; mixing the PET small pieces and the ground CFRP using a single screw extruder to produce PET/CF composite filaments, wherein the PET/CF composite filaments comprise about 10% to about 40% of CF by weight.

In this regard, in certain embodiments, the waste carbon-fiber reinforced polymers (CFRP) used herein can include expired carbon fiber (CF) prepreg, and the waste Polyethylene terephthalate (PET) used herein can come from water bottles. The present mechanical processes can provide composites having improved physical and mechanical properties over those produced by other previous and current processes for recycling PET.

In an embodiment, the present methods can involve the further step of washing the waste PET before shredding the waste PET.

In certain embodiments, the waste carbon fiber reinforced polymer (CFRP) material comprises CFRP, expired CFRP, CFRP prepreg, expired CFRP prepreg, or combinations thereof.

In further embodiments of the present subject matter, the shredding of the CFRP material into CFRP small pieces comprises mechanical shredding without chemical treatment. These CFRP small pieces can be further ground using a ball mill grinder to grind the CFRP small pieces to a size of about 20-50 microns.

In certain embodiments, the drying of the PET small pieces comprises drying the PET small pieces in an oven for about 4 hours at about 160° C.

When combined, the mixing of the PET small pieces and the ground CFRP can be conducted using a single screw extruder that is preheated to a temperature of at least about 245° C. before the mixing. In this regard, the single screw extruder, in certain embodiments, can be preheated to a temperature of about 245° C., or about 245° C. to about 248° C. Once the extruder is preheated, the PET small pieces and the ground CFRP can be mixed using the single screw extruder while the extruder is maintained at a temperature of about 245° C. to about 248° C. and run at a speed of about 10 to about 15 rpm. In this regard, in certain embodiments, the single screw extruder can have a nozzle diameter of about 1.75 mm and the resultant PET/CF composite filaments can have an average filament diameter of about 2 mm.

The present methods can result in a final product comprising PET/CF composite filaments that comprise about 10% to about 40% by weight of CF, about 10% to about 30% by weight of CF, about 10% to about 20% by weight of CF, about 10% by weight of CF, about 15% by weight of CF, about 20% by weight of CF, about 25% by weight of CF, about 30% by weight of CF, about 35% by weight of CF, or about 40% by weight of CF.

In certain embodiments, elasticity modulus, yield strength, tensile strength, and toughness of the PET/CF composite filaments increased as the percentage of carbon fibers in the PET/CF composite filaments increased until the PET/CF composite filaments reached about 20% by weight of CF, and after that they started decreasing.

By way of non-limiting example, the elasticity modulus of the PET/CF composite films having about 20% by weight of CF can reach about 4719.3 MPa, which is about 97.5% greater than that of pure recycled PET. Similarly, the yield strength of the PET/CF composite films having about 20% by weight of CF can reach about 166.7 MPa, which is about 90.33% greater than that of pure recycled PET. Likewise, the tensile strength of the PET/CF composite films having about 20% by weight of CF can reach about 136.8 MPa, which is about 76.2% greater than that of pure recycled PET. Also, the toughness of the PET/CF composite films having about 20% by weight of CF can reach about 390.6 MPa, which is about 163.5% greater than that of pure recycled PET. The Shore A hardness of the PET/CF composite films having about 20% by weight of CF can reach about 75.6, which is about 13% greater than that of the Pure recycled PET.

In alternative embodiments, Shore A hardness of the PET/CF composite filaments increased as the percentage of carbon fibers in the PET/CF composite filaments increased until the PET/CF composite filaments reached about 40% by weight CF, and wherein the Shore A hardness of the PET/CF composite filaments reached about 83.8.

In another embodiment, the process can involve the steps of first, CFRP, including expired CFRP prepreg and other CFRP prepreg, was shredded to small pieces without any chemical treatment. Then the CFRP small pieces were ground using a ball mill grinder. Separately, PET waste water bottles were washed and then shredded to small pieces. The PET shredded pieces were then dried. The next step was mixing the dried PET and the ground CFRP using a single screw extruder to produce different and various CF/PET composite filaments having various CF percentages (including, by way of non-limiting example, 10%, 20%, 30%, 40% by weight of carbon fibers). The temperature and speed of the extruder depend on the percentage of CFRP in the mixture.

In another embodiment, the present subject matter is directed to recycled CF/recycled PET composite filaments product with the mechanical and physical properties improved over that of pure recycled PET. The CF/PET composite filaments properties such as elasticity modulus, yield strength, tensile strength, toughness of the filaments increased as the percentage of carbon fibers (CF) increased until reaching about 20% by weight of carbon fibers. In an embodiment, these properties of the CF/PET composites were superior to those of pure recycled PET.

In an embodiment, the present subject matter is related to CF/PET composite filaments produced by the present method(s), having mechanical and physical properties improved over those of pure recycled PET, as described herein.

By way of non-limiting example, the elasticity modulus of the PET/CF composite films produced according to the present methods having about 20% by weight of CF can reach about 4719.3 MPa, which is about 97.5% greater than that of pure recycled PET. Similarly, the yield strength of the PET/CF composite films produced according to the present methods having about 20% by weight of CF can reach about 166.7 MPa, which is about 90.33% greater than that of pure recycled PET. Likewise, the tensile strength of the PET/CF composite films produced according to the present methods having about 20% by weight of CF can reach about 136.8 MPa, which is about 76.2% greater than that of pure recycled PET. Also, the toughness of the PET/CF composite films produced according to the present methods having about 20% by weight of CF can reach about 390.6 MPa, which is about 163.5% greater than that of pure recycled PET. The Shore A hardness of the PET/CF composite films produced according to the present methods having about 20% by weight of CF can reach about 75.6, which is about 13% greater than that of the Pure recycled PET.

In alternative embodiments, Shore A hardness of the PET/CF composite filaments produced according to the present methods increased as the percentage of carbon fibers in the PET/CF composite filaments increased until the PET/CF composite filaments reached about 40% by weight CF, and wherein the Shore A hardness of the PET/CF composite filaments reached about 83.8.

EXAMPLES

Example 1

Recycling and forming of composite are as follows:
First, expired prepreg CFRP was shredded to small pieces without any chemical treatment. Then, the prepreg CFRP small pieces were ground using a ball mill grinder to 20-50 microns in size.

PET waste water bottles were washed and then shredded to small pieces. The PET shredded pieces were then dried in an oven for 4 hours at 160° C.

Figure 2:
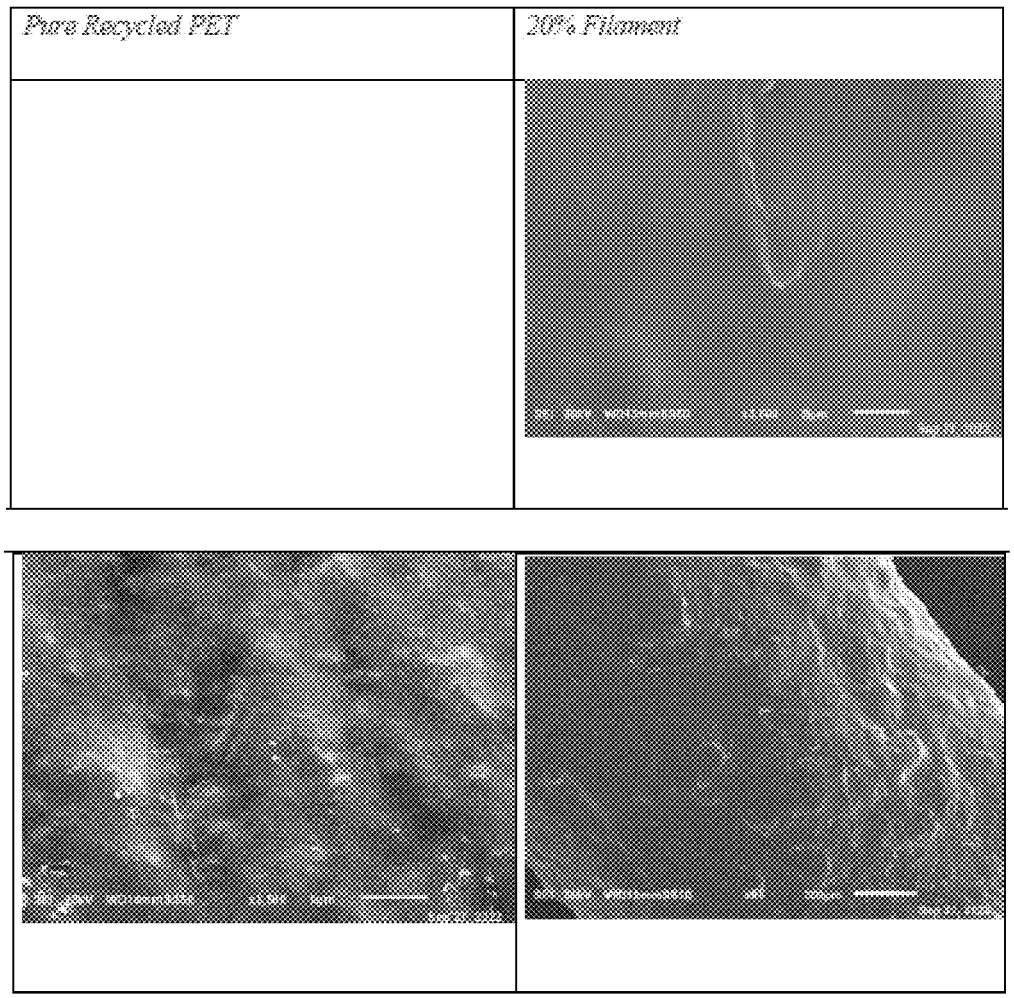
FIG. 2 shows SEM photos of extruded filaments produced according to the present methods.
Figure 3:
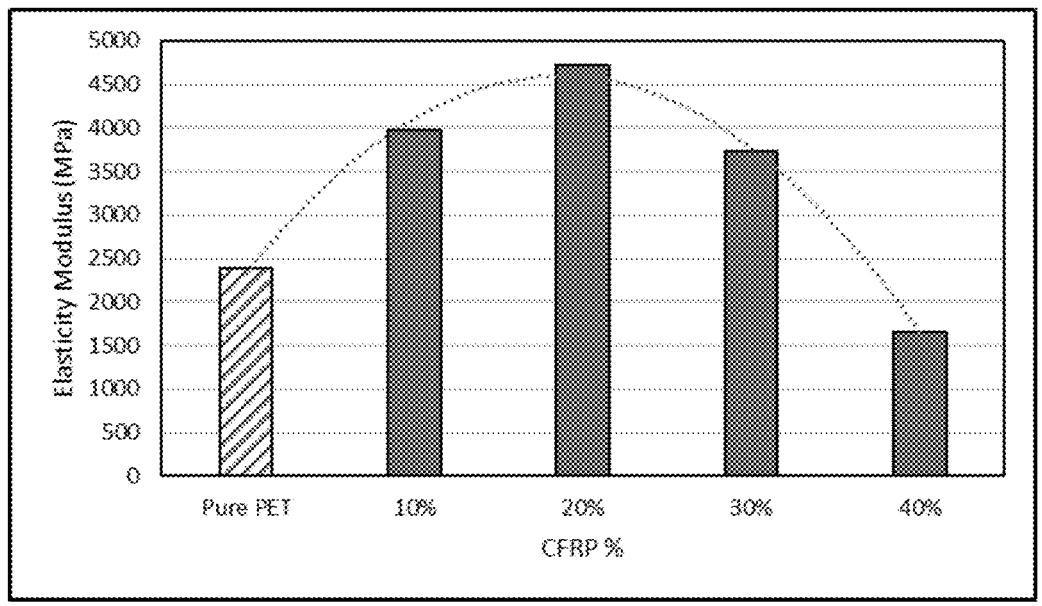
FIG. 3 provides a chart showing the Elasticity Modulus of extruded filaments produced according to the present methods.
Figure 4:
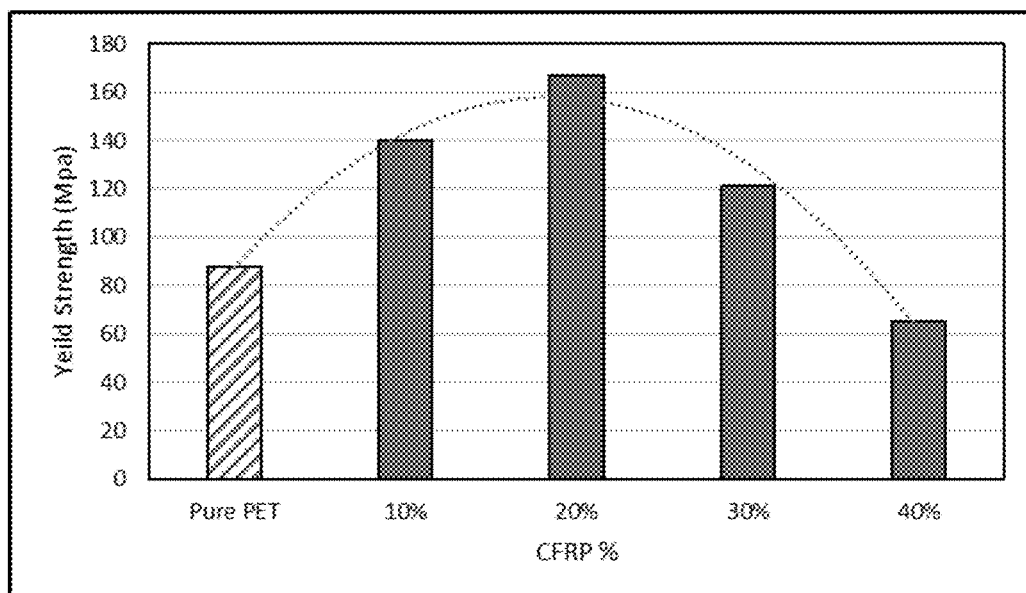
FIG. 4 provides a chart showing the Yield Strength of extruded filaments produced according to the present methods.
Figure 5:
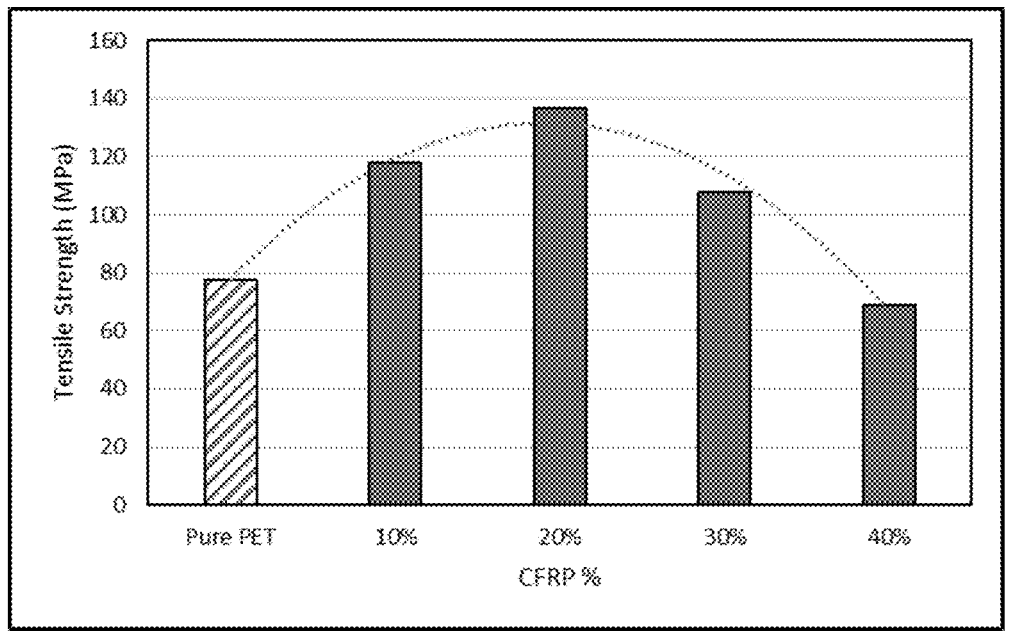
FIG. 5 provides a chart showing the Tensile Strength of extruded filaments produced according to the present methods.
Figure 6:
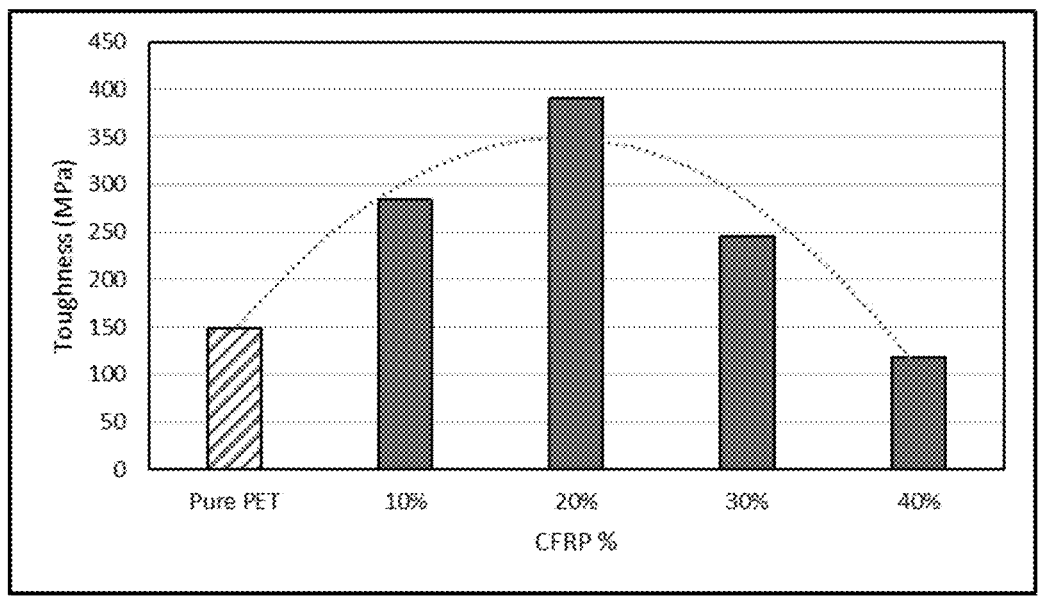
FIG. 6 provides a chart showing the Toughness of extruded filaments produced according to the present methods.
Figure 7:
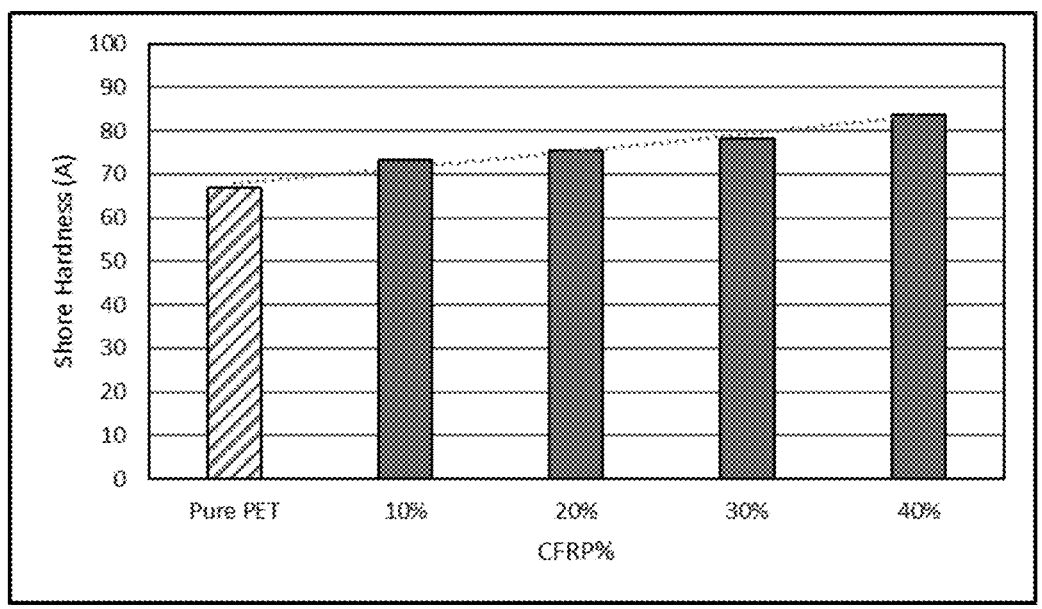
FIG. 7 provides a chart showing the Hardness of extruded filaments produced according to the present methods.

A single screw extruder was preheated until it reached the required temperature of 245° C. The next step was mixing the dried PET and the ground CFRP using a single screw extruder at 245° C.-248° C. and at a speed of 10-15 rpm, where different/various CFRP/PET composite filaments were produced with different/various CFRP percentages (10%, 20%, 30%, 40%). The temperature and speed of the extruder depend on the percentage of CFRP in the mixture. The extruder nozzle diameter was 1.75 mm and the average filament diameter was 2 mm. The resultant filaments can be seen in the photomicrographs of FIGS. 1 and 2.

The mechanical and physical properties of the produced CFRP/PET composite filaments were then tested. The results, as seen in FIGS. 3-7, show that the elasticity modulus, yield strength, tensile strength, and toughness of the filaments increased as the percentage of CF increased until it reached the maximum at 20%, and after that it started decreasing. The elasticity Modulus of the 20% filament was found to be 4719.3 MPa, which is 97.5% greater than that of the Pure recycled PET. The yield strength of the 20% filament is 166.7 MPa which is 90.33% greater than that of the Pure recycled PET. The tensile strength of the 20% filament is 136.8 MPa, which is 76.2% greater than that of the Pure recycled PET. The toughness of the 20% filament is 390.6 MPa, which is 163.5% greater than that of the Pure recycled PET.

It was also found that the hardness of the filaments increased as the percentage of CF increased, and it reached the maximum at 40% at 83.8 Shore A. The hardness of the 20% filament is 75.6 (Shore A), which is 13% greater than that of the Pure recycled PET.

It is to be understood that the process to recycle both PET and CFRP to produce a PET/Carbon Fiber Composite, any use, and properties of said composites are not limited to the specific embodiments or examples described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method to produce polyethylene terephthalate (PET)/Carbon Fiber (CF) composite filaments, the method comprising:
   obtaining waste carbon fiber reinforced polymer (CFRP) material;
   shredding the CFRP material into CFRP small pieces;
   grinding the CFRP small pieces using a ball mill grinder to obtain ground CFRP;
   obtaining waste polyethylene terephthalate (PET);
   shredding the waste PET into PET small pieces;
   drying the PET small pieces;
   mixing the PET small pieces and the ground CFRP using a single screw extruder to produce PET/CF composite filaments, wherein the PET/CF composite filaments comprise about 20% of CF by weight.

2. The method of claim 1, further comprising washing the waste PET before shredding the waste PET.

3. The method of claim 1, wherein the waste carbon fiber reinforced polymer (CFRP) material comprises CFRP material selected from the group consisting of: expired CFRP, CFRP prepreg, expired CFRP prepreg, or combinations thereof.

4. The method of claim 1, wherein the shredding the CFRP material into CFRP small pieces comprises mechanical shredding without chemical treatment.

5. The method of claim 1, wherein the grinding the CFRP small pieces using a ball mill grinder comprises grinding the CFRP small pieces to about 20-50 microns.

6. The method of claim 1, wherein the drying the PET small pieces comprises drying the PET small pieces in an oven for about 4 hours at about 160° C.

7. The method of claim 1, wherein the mixing the PET small pieces and the ground CFRP using a single screw extruder further comprises preheating said extruder to a temperature of at least about 245° C. before the mixing.

8. The method of claim 1, wherein the mixing the PET small pieces and the ground CFRP using a single screw extruder comprises mixing while the extruder is maintained at a temperature of about 245° C. to about 248° C. and run at a speed of about 10 to about 15 rpm.

9. The method of claim 1, wherein the extruder has a nozzle diameter of about 1.75 mm and the PET/CF composite filaments have an average filament diameter of about 2 mm.

10. The method of claim 1, wherein the waste PET is from waste water bottles.

11. Polyethylene terephthalate (PET)/Carbon Fiber (CF) composite filaments produced according to the method of claim 1.

12. The Polyethylene terephthalate (PET)/Carbon Fiber (CF) composite filaments of claim 11, wherein an elasticity modulus of the PET/CF composite films is about 4719.3 MPa, a yield strength of the PET/CF composite films is about 166.7 MPa, a tensile strength of the PET/CF composite films is about 136.8 MPa, a toughness of the PET/CF composite films is about 390.6 MPa, and a Shore A hardness of the PET/CF composite films is about 75.6.

* * * * *